US012601220B2

(12) United States Patent
Price et al.

(10) Patent No.: US 12,601,220 B2
(45) **Date of Patent: *Apr. 14, 2026**

(54) NESTING STACKING GRILLE

(71) Applicant: CornellCookson, LLC, Mountain Top, PA (US)

(72) Inventors: Cole Price, Peoria, AZ (US); Brian Rishi Kachchakaduge Fernando, Avondale, AZ (US); Milton Prosperi, Mountain Top, PA (US)

(73) Assignee: CornellCookson, LLC, Mountain Top, PA (US)

( * ) Notice: Subject to any disclaimer, the term of this patent is extended or adjusted under 35 U.S.C. 154(b) by 281 days.

This patent is subject to a terminal disclaimer.

(21) Appl. No.: 17/875,804

(22) Filed: Jul. 28, 2022

(65) Prior Publication Data

US 2022/0364409 A1 Nov. 17, 2022

Related U.S. Application Data

(63) Continuation of application No. 16/339,900, filed as application No. PCT/US2017/055658 on Oct. 6, 2017, now Pat. No. 11,428,042.

(Continued)

(51) Int. Cl.

*E06B 9/18* (2006.01)
*E06B 5/11* (2006.01)

(52) U.S. Cl.

CPC .. *E06B 9/18* (2013.01); *E06B 5/11* (2013.01)

(58) Field of Classification Search

CPC ..... E06B 9/11; E06B 9/15; E06B 9/18; E06B 2009/1505; E06B 2009/1566;

(Continued)

(56) References Cited

U.S. PATENT DOCUMENTS

| | | | |
|---|---|---|---|
| 2,940,520 | A | 6/1960 | Cookson |
| 3,066,549 | A | 12/1962 | Benjamin |

(Continued)

FOREIGN PATENT DOCUMENTS

| | | | |
|---|---|---|---|
| DE | 588847 | C * | 12/1933 |
| EP | 0795675 | A2 * | 9/1997 |

(Continued)

OTHER PUBLICATIONS

EP 0795675 Machine translation, 1997; retrieved from https://worldwide.espacenet.com/publicationDetails/biblio?CC=EP&NR=0795675A2&KC=A2&FT=D&ND=5&date=19970917&DB=&locale=en_EP (Year: 1997).*

(Continued)

*Primary Examiner* — Abe Massad

(57) ABSTRACT

In some embodiments, a nesting grille may include an alpha link having a top alpha link grommet, a beta link, and a plurality of cross members. In some embodiments, each of the plurality of cross members are coupled to at least one of the alpha link and the beta link. In one embodiment, the top alpha link grommet is configured to receive one of the plurality of cross members. In one embodiment, the grille is configured to be moveable between an extended state and a retracted state, the grille coiled about itself with the alpha link disposed inside of the beta link when the grille is in the retracted state.

20 Claims, 18 Drawing Sheets

Related U.S. Application Data

(60) Provisional application No. 62/404,863, filed on Oct. 6, 2016.

(58) Field of Classification Search
CPC ....... E06B 2009/155; E06B 2009/1538; E06B 2009/1544; E06B 5/11
See application file for complete search history.

(56) References Cited

U.S. PATENT DOCUMENTS

| | | | | |
|---|---|---|---|---|
| 3,141,347 | A | 7/1964 | Onulak | |
| 3,817,028 | A | 6/1974 | Blackwood | |
| 4,635,438 | A | 1/1987 | Rottinghaus | |
| 5,020,769 | A | 6/1991 | Botes | |
| 5,265,663 | A * | 11/1993 | Munekata | E06B 9/15 160/133 |
| 6,189,593 | B1 | 2/2001 | Katchur | |
| 6,240,997 | B1 | 6/2001 | Lee | |
| 6,374,897 | B1 | 4/2002 | Liu | |
| 6,631,749 | B1 | 10/2003 | Zabala | |
| 7,357,171 | B2 | 4/2008 | Miller | |
| 7,409,980 | B1 | 8/2008 | Heissenberg | |
| 8,162,025 | B2 * | 4/2012 | Motosko | E06B 9/15 160/180 |
| 8,746,321 | B2 | 6/2014 | Miller | |
| 9,309,715 | B2 | 4/2016 | Miller | |
| 9,803,420 | B2 * | 10/2017 | Ronchetti | E06B 9/0638 |
| 2004/0163777 | A1 | 8/2004 | Frede | |
| 2005/0241924 | A1 | 11/2005 | Damkjaer | |
| 2006/0090988 | A1 | 5/2006 | Damkjaer | |
| 2008/0164128 | A1 | 7/2008 | Ririe | |
| 2012/0090793 | A1 * | 4/2012 | Beulen | E06B 9/581 160/133 |
| 2014/0053991 | A1 * | 2/2014 | Miller | E06B 9/11 160/133 |
| 2014/0231227 | A1 | 8/2014 | Sharma | |
| 2015/0101762 | A1 | 4/2015 | Miller | |
| 2016/0230450 | A1 | 8/2016 | Ronchetti | |

FOREIGN PATENT DOCUMENTS

| | | | |
|---|---|---|---|
| FR | 2823652 | A1 | 10/2002 |
| GB | 425012 | A | 3/1935 |
| JP | H0249494 | | 5/1990 |
| JP | 2001140558 | A | 5/2001 |
| WO | WO2008/083778 | A1 | 7/2008 |

OTHER PUBLICATIONS

European Search Report dated Apr. 17, 2020 for European Patent Application No. 17859299.4, 7 pages.

International Search Report and Written Opinion dated Dec. 29, 2017 of International Patent Application No. PCT/US17/55658.

“New Rolling Security Shutter with Compact Design—Model 523” uploaded by Wayne Dalton Garage Doors on Mar. 11, 2016 [retrieved Feb. 11, 2017] Retrieved from the Internet: <https://www.youtube.com/watch?v=Cxc49e2rKAw>.

Advanced Performance Rolling Steel Service Doors, Overhead Door [online], Jun. 27, 2016 [retrieved on Nov. 21, 2017], Retrieved from the Internet: <http://web.archive.org/web/20160627204954/http:overheaddoor.com:80/rolling-steel-service-doors-627 >.

* cited by examiner

NESTING STACKING GRILLE

CROSS-REFERENCE TO RELATED APPLICATIONS

This application is a continuation of U.S. patent application Ser. No. 16/339,900 filed on Apr. 5, 2019, which is a U.S. 371 Application of International Application No. PCT/US2017/55658 filed on Oct. 6, 2017, which claims the benefit of U.S. Provisional Patent Application No. 62/404,863 filed Oct. 6, 2016 entitled "Nesting Stacking Grille", which are all incorporated by reference herein in its entirety.

BACKGROUND OF THE INVENTION

The present invention generally relates to a closure and, more particularly, to a grille for occluding an opening.

Conventional grilles or doors prevent unwanted persons or objects from traversing through an opening. Such closures are usually movable between an extended state where the closure occludes the opening and a retracted state where the closure occludes the opening by a lesser amount. The closures may be stored on the side, or above, the opening in a storage space or header. Thus, a need exists for a closure which is arranged to be stored more compactly to minimize the size of the header to store the closure in the retracted position.

BRIEF SUMMARY OF THE INVENTION

In one embodiment there is a compact nesting grille comprising an alpha link having a first alpha link grommet, a beta link, and a plurality of cross members. In one embodiment, each of the plurality of cross members are coupled to at least one of the alpha link and the beta link. The first alpha link grommet may be configured to receive one of the plurality of cross members. The grille may be configured to be moveable between an extended state and a retracted state and the grille may be coiled about itself with the alpha link disposed inside of the beta link when the grille is in the retracted state.

The alpha link may include a second alpha link grommet, and an alpha link body coupling the first alpha link grommet to the second alpha link grommet. A ratio of an outer diameter of the first alpha link grommet to a length of the alpha link body may be about 2.4 to about 2.9. The beta link may include a first beta link grommet, a second beta link grommet, and a beta link body coupling the first beta link grommet to the second beta link grommet. The alpha link body may have a curved shape with an alpha link outside radius of curvature and an alpha link arc length and the beta link body may have a curved shape with a beta link inner radius of curvature and a beta link arc length. The beta link inner radius of curvature may be different from the alpha link outside radius of curvature. The beta link arc length may be greater than the alpha link arc length. The beta link arc length may be greater than the alpha link arc length by approximately 3% to approximately 8% of the first alpha link grommet outer diameter. A ratio of the alpha link arc length to the beta link arc length may be about 0.9 to about 1.4. The first alpha link grommet and the second beta link grommet may both be coupled to the same one of the plurality of cross members. The first alpha link grommet and the second beta link grommet may be space from each other while both coupled to the same one of the plurality of cross members. The first alpha link grommet and the second alpha link grommet may each include a through hole configured to rotatingly receive one of the plurality of cross members. The first alpha link grommet and the second alpha link grommet may each include a through hole configured to rotatingly receive one of the plurality of cross members. Each of the first alpha link grommet and the second alpha link grommet may comprise a closed loop. The first alpha link grommet and the second alpha link grommet may have substantially the same shape and be on opposing sides of the alpha link body.

The alpha link body may include a first end, a second end, and an alpha link central axis extending from the first end to the second end. The alpha link may comprise a second alpha link grommet having a center point positioned below the central axis and the first alpha link grommet may have a center point positioned above the central axis. A distance of the center point of the first alpha link grommet to the central axis may be equal to a distance of the center point of the second alpha link grommet to the central axis. The beta link may include a proximal end, a distal end, and a median axis extending from the proximal end to the distal end. The beta link may comprise a first beta link grommet having a center point positioned above the median axis and a second beta link grommet having a center point positioned below the median axis. The center point of the first alpha link grommet is a distance above the central axis of the alpha link that is equal to a distance of the center point of the second beta link grommet below the median axis of the beta link. The first alpha link grommet and the second beta link grommet may each be coupled to the same one of the plurality of cross members.

The beta link may be included in a plurality of beta links that form a single, substantially circular beta link layer when the grille is in the retracted state. The number of links in the alpha layer may be equal to the number of links in the beta layer. The beta link may comprise a first beta link grommet and a line through a midpoint of each of the first alpha link grommet and the first beta link grommet may be tangent to the shaft when the grille is in the retracted state. The alpha link layer may comprise eight links.

In a further embodiment, the grille includes an intermediary link between the alpha link and the beta link. The alpha link and the beta link may be co-planar when the grille is in the extended state. The grille may comprise a 14 foot tall grille and be configured to be stored in a 10.5 inch headroom. The grille may comprise a width of at least 26 feet and a height of at least 14 feet and be configured to be coiled about a 6 inch shaft and fit within a 10.5 inch headroom. The alpha link thickness may be within about 77% to about 100% of a beta link thickness. The grille may include additional alpha links aligned with the alpha link in a generally horizontal row when the grille is in the extended state and each of the additional alpha links may be coupled to the same one of the plurality of cross members. The grille may be configured to move from the extended state to the retracted state while producing a maximum sound of about 60 dB to about 70 dB.

In a further embodiment, a plurality of additional link layers with each additional link layer comprising a plurality of links having an arcuate link body disposed between a first link grommet and a second link grommet. Each of the additional links may be joined together and to the substantially circular outer link layer by a plurality of additional cross members to from a substantially circular nested layer configuration when the grille is in the retracted state. When the grille is in the retracted position, the substantially circular beta link layer, the substantially circular alpha link layer, and the additional link layers may be connected to form a continuous chain that circumscribes a central core to form a plurality of adjoining layers wherein at least one grommet in each layer may be aligned with at least one grommet in an adjoining layer to form an arcuate line bisecting each grommet in the arcuate line. When the grille is in the retracted position, the substantially circular beta link layer, the substantially circular alpha link layer, and the additional link layers may be connected to form a continuous chain of link layers that circumscribes a central core to form a plurality of adjoining layers wherein each link in each of the plurality of adjoining layers is in contact with no more than two links of a single adjoining layer.

BRIEF DESCRIPTION OF THE SEVERAL VIEWS OF THE DRAWINGS

The foregoing summary, as well as the following detailed description of embodiments of the nesting stacking grille, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE INVENTION

Figure 1:
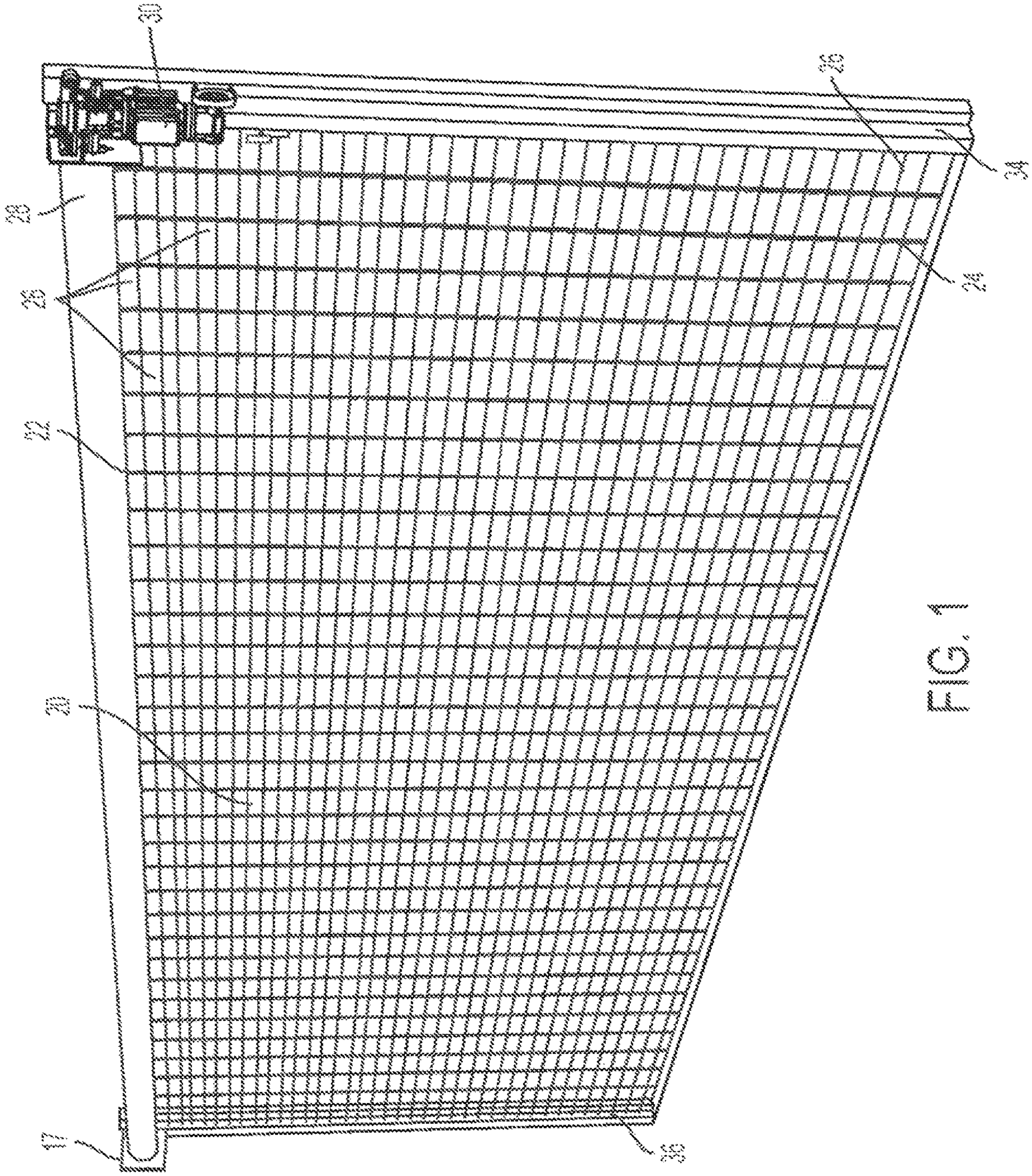
FIG. 1 is a front perspective view of a grille in accordance with an exemplary embodiment of the present invention in an extended state.
Figure 2:
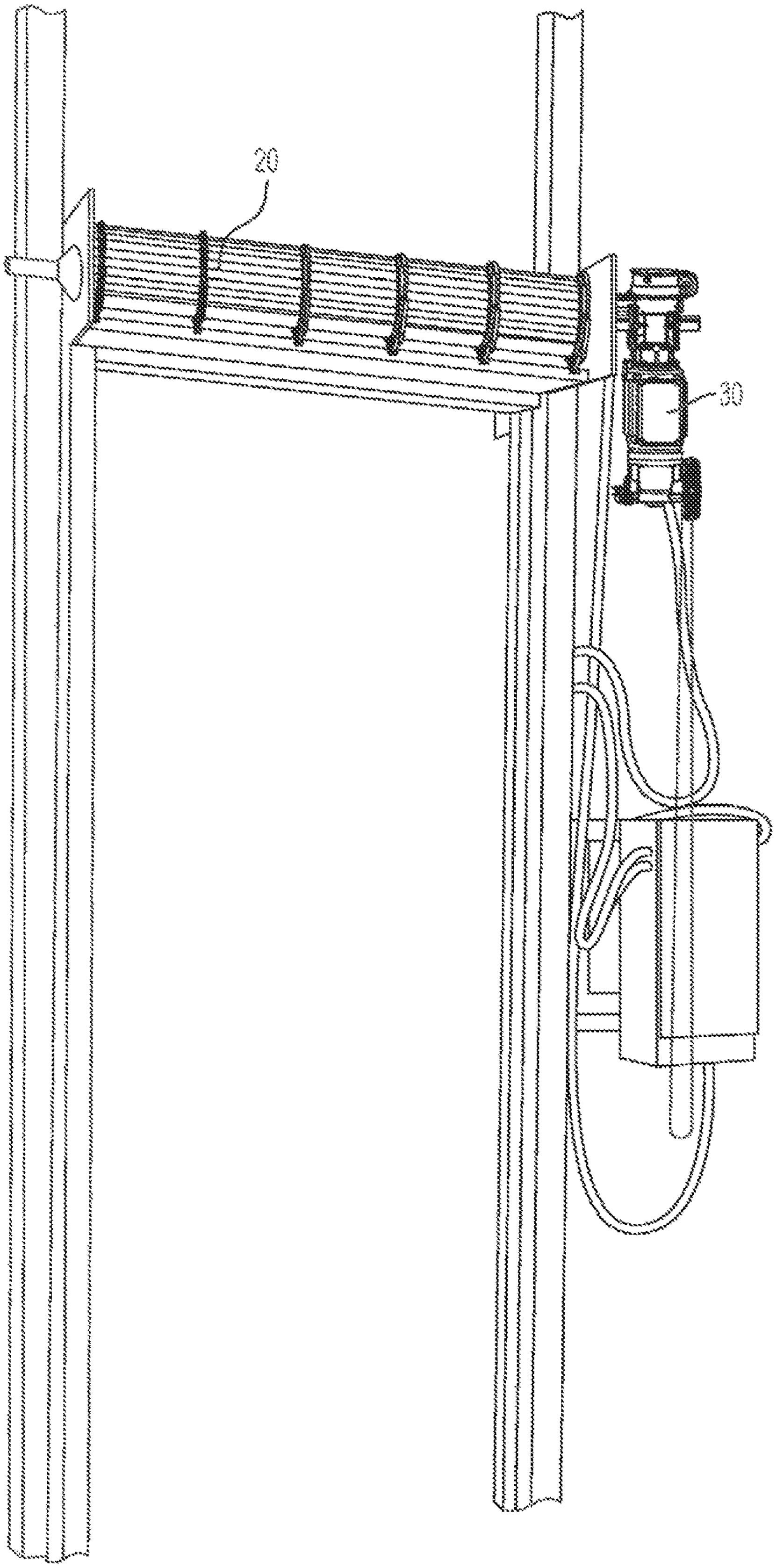
FIG. 2 is a front perspective view of the grille of FIG. 1 in the retracted state.

Referring to the drawings in detail, wherein like reference numerals indicate like elements throughout, there is shown in FIG. 1 a grille, generally designated 20, in accordance with an exemplary embodiment of the present invention. In some embodiments, the grille 20 provides a temporary, or permanent, barrier for an opening such as a doorway, window, etc. and is moveable between an extended state (such as an extended state illustrated in FIG. 1) wherein the grille significantly occludes the opening and a retracted state (such as a retracted stated illustrated in FIG. 2) wherein the opening is less occluded by the grille. In some embodiments, the grille 20 is configured such that it compactly nests about itself such that the coiled grille occupies less space than traditional coiling grilles, as explained in greater detail below. In one embodiment, a fourteen-foot-high grille is configured to be stored in a headroom 17 of about 10 inches to about 11 inches. In one embodiment, the grille 20 comprises a width of at least 25 feet and a height of at least 14 feet and is configured to be coiled about a 6-inch shaft and fit within about 11 inches to about 12 inches of headroom. In one embodiment, the grille 20 comprises a width of at least 15 feet and a height of at least 9 feet and is configured to be stored in a headroom of about 10 inches to about 11 inches.

In one embodiment, the grille 20 includes a plurality of links 22, 24 and a plurality of cross members 26. In one embodiment, plurality of links 22, 24 includes an alpha link 22 and a beta link 24. In one embodiment, the plurality of links are each configured to rotatingly receive at least one of the plurality of cross members 26 (explained in greater detail below). In one embodiment, the relative rotation between the plurality of links 22, 24 and the cross members 26, and the shape, dimension, or orientation of the plurality of links, enables the door to coil about itself as the shaft is rotated. In one embodiment, the grille 20 is coiled about a shaft 28 when the grille is in the retracted state. In one embodiment, a layer 21 of alpha links 22 surrounds the shaft 28 when the grille 20 is in the retracted state (best seen in FIG. 13). In one embodiment, a layer 23 of beta links 24 surrounds, and is compactly nested with, the layer 21 of alpha links 22 when the grille 20 is in the retracted state. In one embodiment, the nesting of beta links 24 relative to alpha links 22 is configured such that convex portions of beta links 24 are received by concave portions of alpha links 22 while concave portions of beta links 24 at least partially wrap convex portions of alpha links 22. In one embodiment, a motor 30 is configured to rotate the shaft 28 to move the grille 20 between the extended state and the retracted state.

Figure 3:
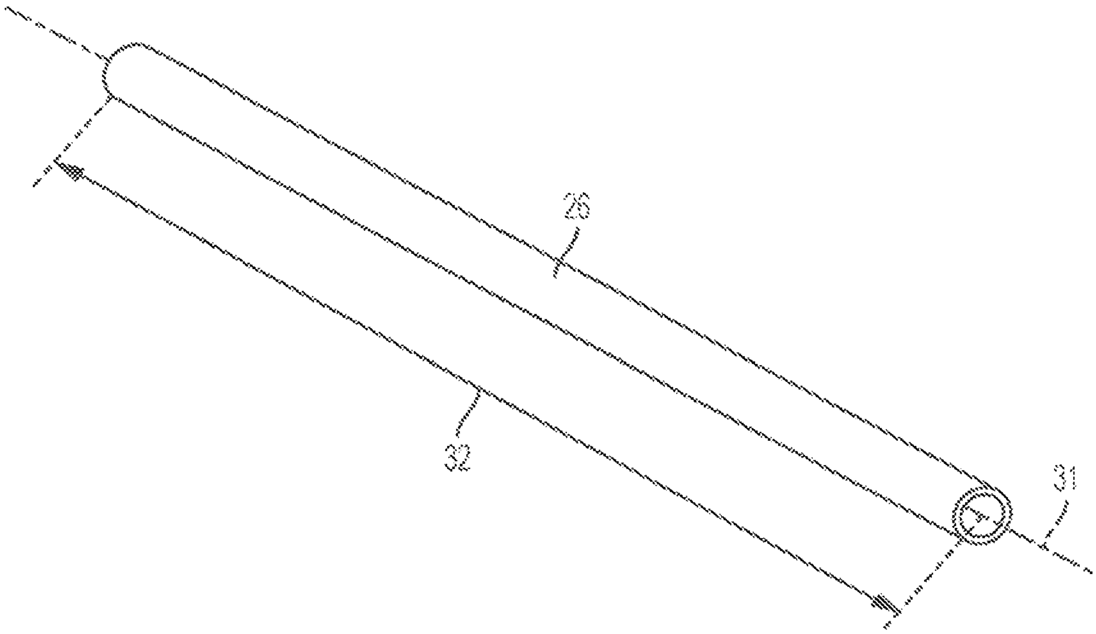
FIG. 3 is a top perspective view of a cross member in accordance with an exemplary embodiment of the present invention.
Figure 4:
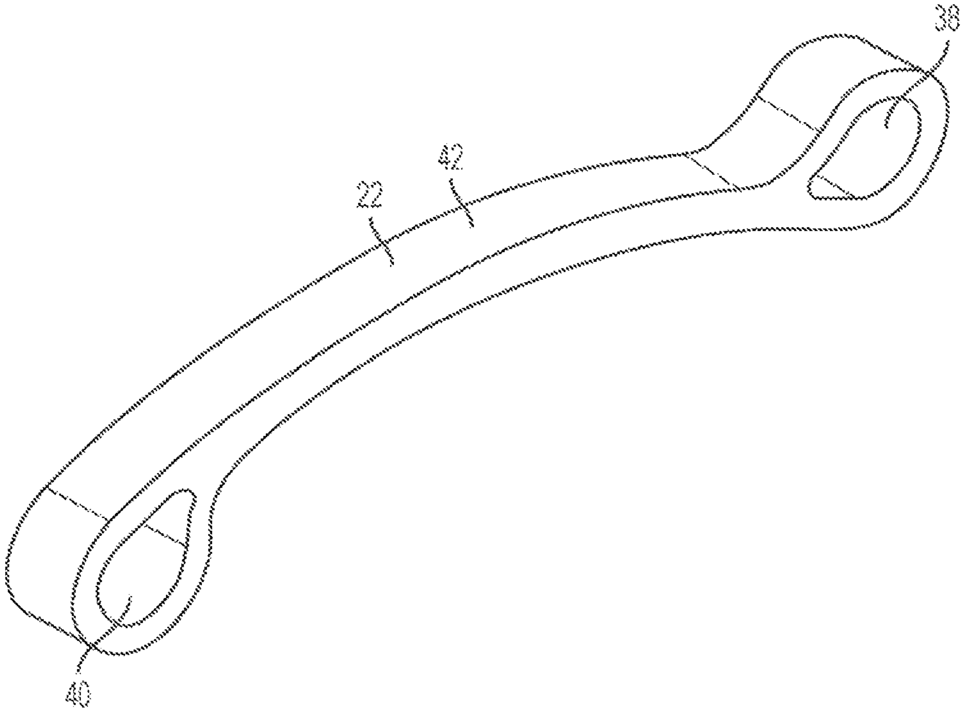
FIG. 4 is a front perspective view of an alpha link in accordance with an exemplary embodiment of the present invention.

FIG. 3 illustrates one embodiment of a cross member 26. In some embodiments, one or more of the plurality of cross members 26 have a width 32 such that the cross members extend from a first track 34 of the opening to a second track 36 of the opening (FIG. 1). In one embodiment, the cross members 26 prevent a person or object from passing through the opening when the grille 20 is in the extended state because the cross members extend into at least one of the tracks 34, 36 and are prevented from leaving the tracks even if a force is applied to the cross members. In one embodiment, the plurality of cross members 26 are each separated from one another by the plurality of links such that the grille is characterized by an alternating cross member-link-cross member-link pattern. In one embodiment, the plurality of cross members 26 are configured to be cylindrical rods disposed about an axis of symmetry 31. In one embodiment, the each of the plurality of cross members 26 has a diameter of about 0.2 inches to about 0.5 inches. In one embodiment, at least a portion of the cross members 26 have a cross-sectional shape other than circular (e.g., rectangular, triangular) provided that the cross members 26 are received by the plurality of links, as explained in greater detail below. In one embodiment, the cross members 26 are spaced from each other when the grille 20 is in the extended state such that an observer can look through the grille 20. In one embodiment, the cross members 26 include slats which are contiguous when the grille 20 is in the extended state such that an observer cannot see through the opening.

Figure 5:
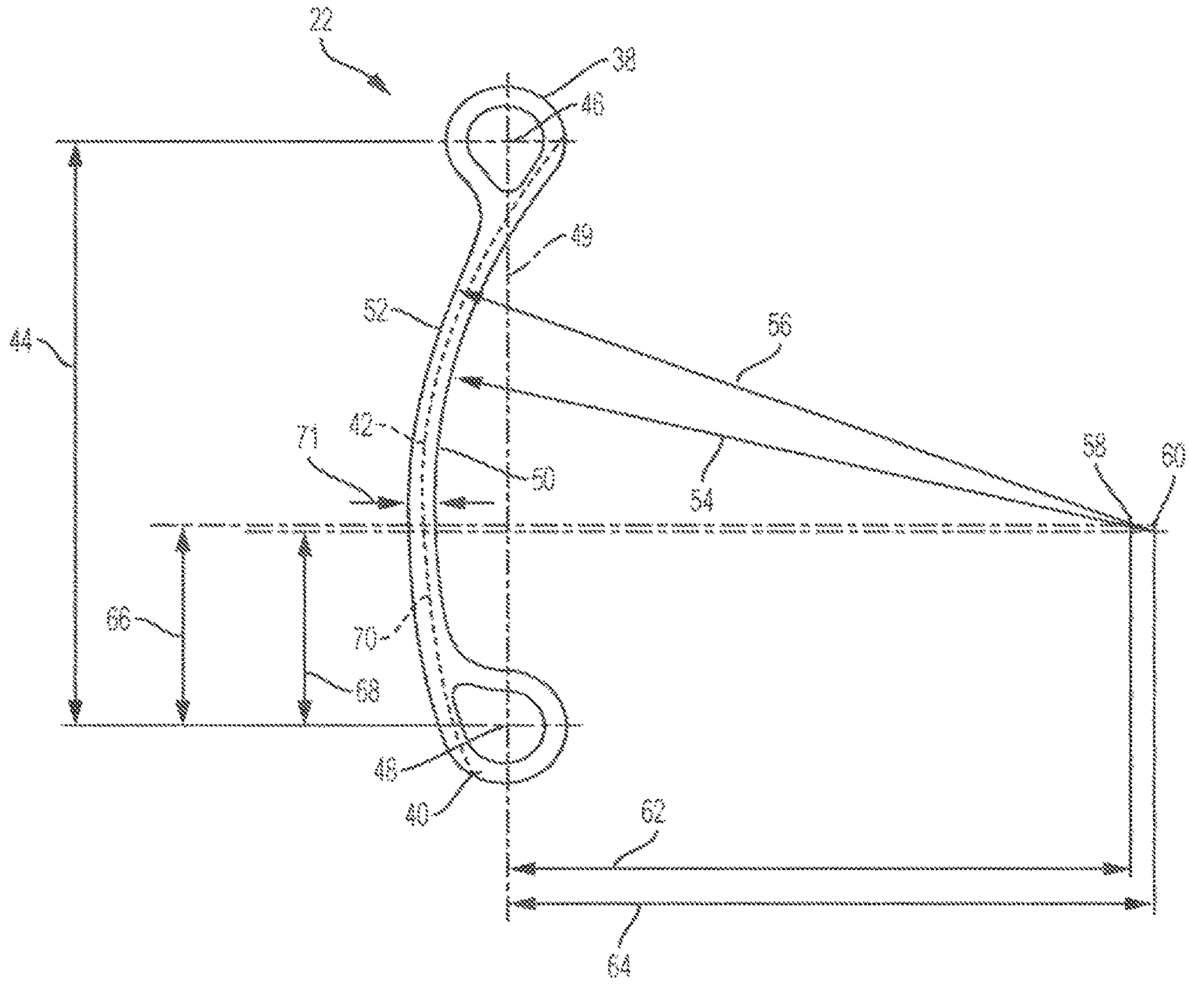
FIG. 5 is a side elevation view of the alpha link of FIG. 4.

FIG. 5 illustrates a side view of one embodiment of an alpha link 22. In some embodiments, a plurality of alpha links 22 separates a plurality of cross members 26 at the top portion of the opening from each other such that as the shaft 28 at the top of the opening is rotated, the alpha link layer 21 formed by the plurality of alpha links 22 includes the inner most layer and is adjacent the shaft 28. In one embodiment, the alpha link 22 is defined by a shape configured to compactly nest about the shaft when the grille is in the retracted state such as the shape illustrated in FIGS. 11 and 13-16. In one embodiment, the alpha link 22 includes a top alpha link grommet 38 and a bottom alpha link grommet 40 (best seen in FIGS. 4-8) each having an opening configured to rotatingly receive one of the plurality of cross members 26 such that the alpha link 22 and the cross member 26 can rotate relative to each other about the cross member axis 31.

In one embodiment, the top alpha link grommet 38 and the bottom alpha link grommet 40 are both coupled to an alpha link body 42 (FIG. 5). In some embodiments, body 42 has an arcuate shape configured to more compactly nest about the shaft than a body having a straight shape. In one embodiment, the alpha link 22 is a monolithic element including the top alpha link grommet 38, bottom alpha link grommet 40, and the alpha link body 42. In one embodiment, the body 42 is characterized by a length 44 as measured between a top alpha link grommet midpoint 46 and a bottom alpha link grommet midpoint 48. In one embodiment, the top alpha link grommet midpoint 46 and the bottom alpha link grommet midpoint 48 are positioned on an axis 49. In some embodiments, the length 44 influences the amount of space between adjacent cross members 26 when the grille 20 is in the extended state. In some embodiments, the alpha link 22 is characterized by a thickness 45 (FIG. 8) selected based on the material comprising the alpha link and the cross members 26, the height of the opening, the width of the opening, and/or the distance between grommet midpoints 46, 48. In one embodiment, the thickness 45 is about 0.15 inches to about 0.35 inches. In one embodiment, the length 44, 47 of the alpha link 22 is about 3 inches to about 4 inches.

In some embodiments, the alpha link body 42 includes an arcuate shape defined by an inner edge 50 and an outer edge 52 (FIG. 5). In some embodiments, the outer edge 52 of the alpha link 22 is shaped such that the inner edge of a link in an adjoining link layer and the outer edge 52 of the alpha link 22 compactly nest together when the grille is in the retracted configuration (best seen in FIG. 11). In some embodiments, compact nesting of adjoining links includes at least 50% of respective inner edges and outer edges touching one another in the retracted state. In other embodiments, compact nesting of adjoining links includes a continuous segment of at least 50% of respective inner edges and outer edges being a substantially uniform distance apart from one another in the retracted state. In some embodiments, compact nesting of adjoining links includes at least 95% of respective inner edges and outer edges touching one another in the retracted state. In other embodiments, compact nesting of adjoining links includes a continuous segment of at least 95% of respective inner edges and outer edges being a substantially uniform distance apart from one another in the retracted state. In one embodiment, the inner edge 50 is defined by an arc having an inner edge arc radius 54. In one embodiment, the outer edge 52 is defined by an arc having an outer edge arc radius 56. In one embodiment, the distance 62 between the inner edge arc center point 58 and the bottom alpha link grommet midpoint 48 is less than the distance 64 between the outer edge center point 60 and the bottom alpha link grommet midpoint 48. In one embodiment, the distances 62, 64 are equal. In one embodiment, the distance 62 is greater than the distance 64. In one embodiment, the distance 66 between the inner edge arc center point 58 and the bottom alpha link grommet midpoint 48 is greater than the distance 68 between the outer edge center point 60 and the bottom alpha link grommet midpoint 48. In one embodiment, the distances 66, 68 are equal. In one embodiment, the distance 66 is greater than the distance 68. In one embodiment, the alpha link body is defined by a width 71 as measured between the inner edge 50 and outer edge 52. In one embodiment, the inner edge radius 54 is smaller than the outer edge arc radius 56. In one embodiment, the inner edge radius 54 is larger than the outer edge arc radius 56. In one embodiment, the inner edge radius 54 is equal to the outer edge arc radius 56.

In one embodiment, the inner edge 50 and outer edge 52 include arcs having different radii and the width 71 is different at different points along the alpha link body 42 as the inner edge 50 and outer edge 52 diverge or converge from one another. In one embodiment, at least one of the inner edge 50 and the outer edge 52 are defined at least in part by an arc having a single radius. In another embodiment, at least one of the inner edge 50 and the outer edge 52 are defined at least in part by a plurality of arc segments having different radii. In one embodiment, the plurality of radii create a link having a varying thickness wherein a portion of the link subject to greater localized stress can selectively include a greater thickness than portions of the link subject to lower localized stress. In one embodiment, at least one of the inner edge 50 and the outer edge 52 include an arcuate segment and a straight segment. In one embodiment, at least one of the inner edge 50 and the outer edge 52 include a concave arcuate segment and a convex arcuate segment. In one embodiment, the inner edge 50 has an arc length of about 1.7 inches to about 1.9 inches. In one embodiment, the outer edge 52 has an arc length of about 1.7 inches to about 2.1 inches. In one embodiment, the outer edge arc is slightly longer than the inner edge arc due to the larger radius of the outer arc. In one embodiment, the outer edge arc length is about 1% to about 2% greater than the inner edge arc length.

Figure 6:
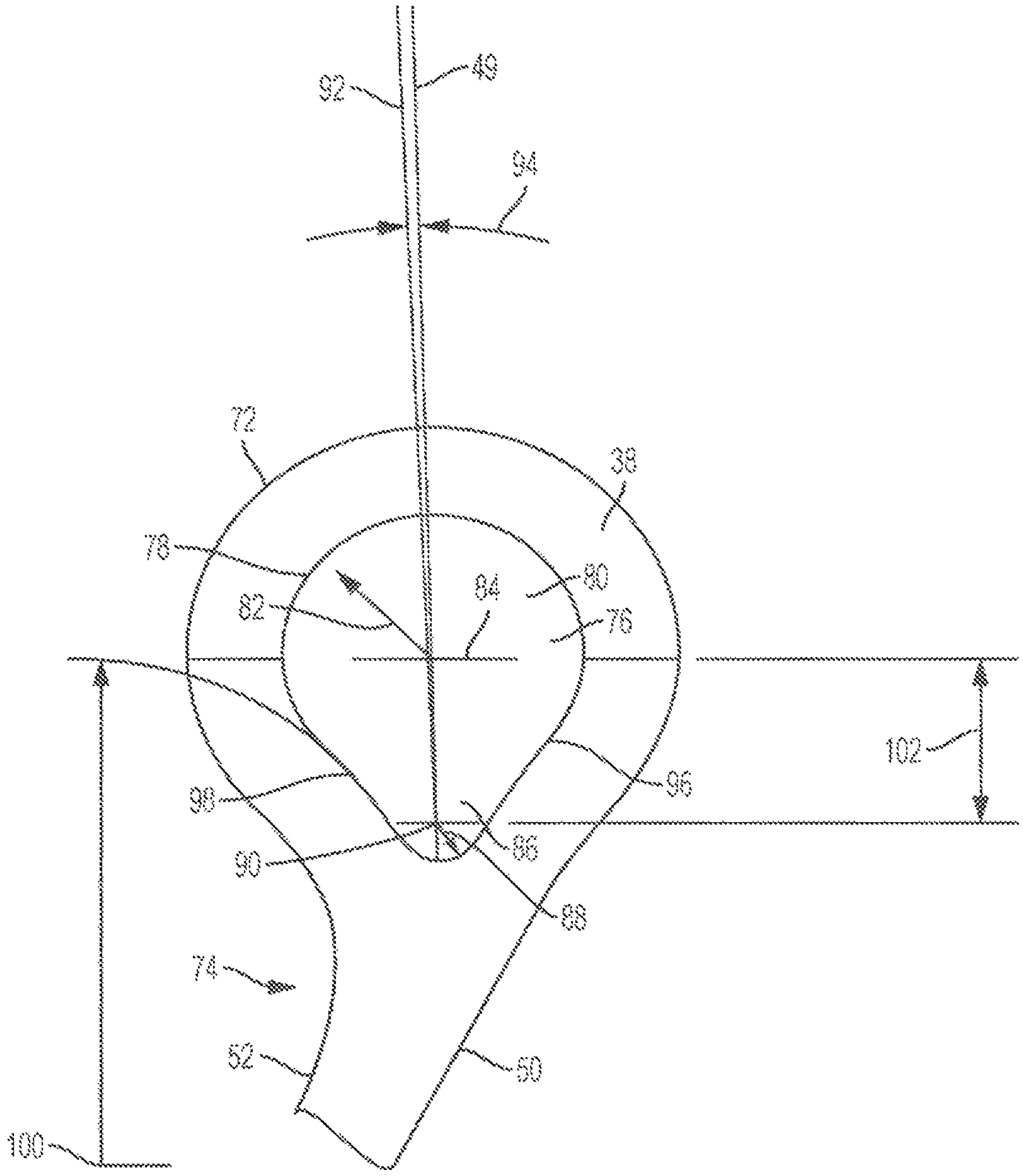
FIG. 6 is a close up side elevation view of the top grommet of FIG. 4.
Figure 13:
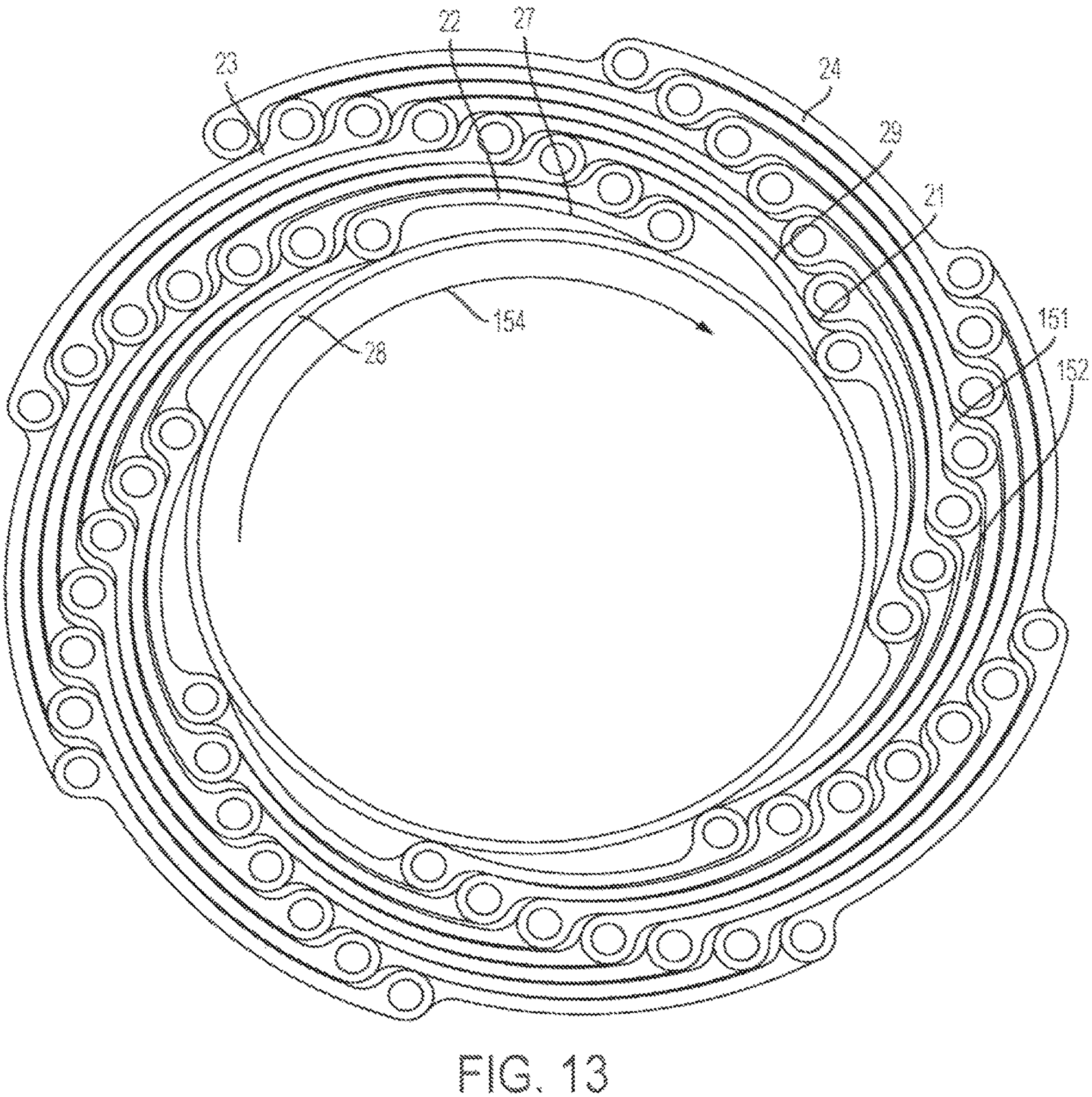
FIG. 13 is a sectional view of the grille and shaft of FIG. 1 in the retracted state.

FIG. 6 illustrates one embodiment of a top alpha link grommet 38. In some embodiments, one or both of the position of the top alpha link grommet 38 and the position of the bottom alpha link grommet 40 relative to the alpha link body 42 is configured such that the grille 20 can stack more compactly (FIG. 11) than if the cross members 26 were radially stacked on each other (not shown) when the grille is in the retracted state. In one embodiment, the alpha link body 42 includes a midline 70 substantially equidistant from the inner edge 50 and outer edge 52 (FIG. 5). In one embodiment, the top alpha link grommet midpoint 46 is positioned on a first side of the midline 70 of the alpha link body 42 and the bottom alpha link grommet midpoint 48 is positioned on a second side (e.g., an obverse second side) of the midline 70. In one embodiment, the top alpha link grommet 38 includes an outer wall 72 and an inner wall 78. In one embodiment, the top alpha link grommet 38 includes a wall thickness defined by the distance between the outer wall 72 and inner wall 78. In one embodiment, the top alpha link grommet wall thickness is substantially uniform. In one embodiment, the wall thickness of the top alpha link grommet has one portion that is thicker than another portion. In one embodiment, the outer wall 72 includes a semicircular shape. In one embodiment, the inner wall 78, and the top alpha link grommet 38, comprises a closed loop. In one embodiment, the outer wall 72 includes a non-circular shape (e.g., elliptical, oval, angular). In one embodiment, the outer wall 72 and the grommet 38 having an arcuate shape forming a portion of a circle but is not a closed loop (provided that the cross member is secured within the grommet). In one embodiment, the outer wall 72 includes a semicircular shape and the inner edge 50 is tangent to the semicircular outer wall. In one embodiment, there is a transition 74 between the outer edge 52 and the outer wall 72. In one embodiment, the transition 74 comprises an arc, fillet, or chamfer. In one embodiment, the outer wall 72 of one grommet is configured to nest adjacent the transition 74 of another link in an adjacent link layer when the door is in the retracted state (FIG. 13). In one embodiment, the transition 74 comprises an arcuate segment having a radius equal to an outer surface radius of the bottom alpha link grommet. In one embodiment, a ratio of an outer diameter of the top alpha link grommet 38 to the arcuate length of the inner link body midline 70 is about 0.9 to about 1.1. In one embodiment, the arc defining the outer wall 72 of the grommet has a radius of about 0.15 inches to about 0.4 inches.

In some embodiments, an opening 76 configured to rotatingly receive one of the cross members 26 extends through the top alpha link grommet 38. Referring to FIG. 6, in one embodiment, the opening 76 is configured such that the alpha link 22 and the cross member 26 can rotate relative to one another (e.g., the opening 76 may be slightly larger in diameter than the cross member 26) when the opening 76 is positioned about the cross member 26. In one embodiment, the opening 76 is configured to receive the cross member 26 and is oversized to reduce the overall weight of the alpha link 22 as compared to a link having a smaller opening 76 (not shown). In one embodiment, the opening 76 is defined by the inner wall 78 of the top alpha link grommet 38 (FIG. 6). In one embodiment, the inner wall 78 defines a circular opening 76. In one embodiment, the inner wall 78 defines an opening 76 having a teardrop shape. In one embodiment, the opening 76 includes a major portion 80 having a major radius 82 and a major portion center point 84. In one embodiment, the major portion center point 84 is the center of the arc defining the outer wall 72. In one embodiment, the major portion 80 is configured to receive the cross member 26. In one embodiment, the major portion radius is about 4% to about 7% larger than the radius of the cross member 26. In one embodiment, the opening includes a minor portion 86 having a minor radius 88 and a minor portion center point 90. In one embodiment, the size of the minor portion is selected based on the properties of the material selected for the link to remove as much of the material possible while maintaining a design that can withstand the load imparted on the link during use of the grille 20. In one embodiment, the major portion center point 84 and the minor portion center point 90 are positioned on a top alpha link grommet axis 92. In one embodiment, the top alpha link grommet axis 92 is generally parallel to the alpha link axis 49. In one embodiment, the top alpha link grommet axis 92 is transverse to the alpha link axis 49. In one embodiment, an angle 94 between the top alpha link grommet axis 92 and the alpha link axis is about 0.5° to about 2.5°. In one embodiment, the major radius 82 is about 0.1 inches to about 0.3 inches. In one embodiment, the minor radius 88 is about 0.02 inches to about 0.075 inches. In one embodiment, a distance 102 between the major center point 84 and the minor center point 90 is about 0.1 inches to about 0.4 inches.

In one embodiment, the inner wall 78 includes a first transition 96 and a second transition 98 between the major portion 80 and the minor portion 86 (best seen in FIG. 6). In one embodiment, the shape of the transitions are selected based on the strength of the material comprising the grommet to ensure that the grommet can withstand any forces imparted by the cross member during operation or use of the grille. In one embodiment, the first transition 96 is a tangent to the arcs defined by the major portion 80 and the minor portion 86. In one embodiment, the second transition 98 includes an arc (or fillet) having a radius 100. In one embodiment, the second transition 98 includes an arc having a radius 100 of about 0.2 inches to about 0.5 inches.

Figure 7:
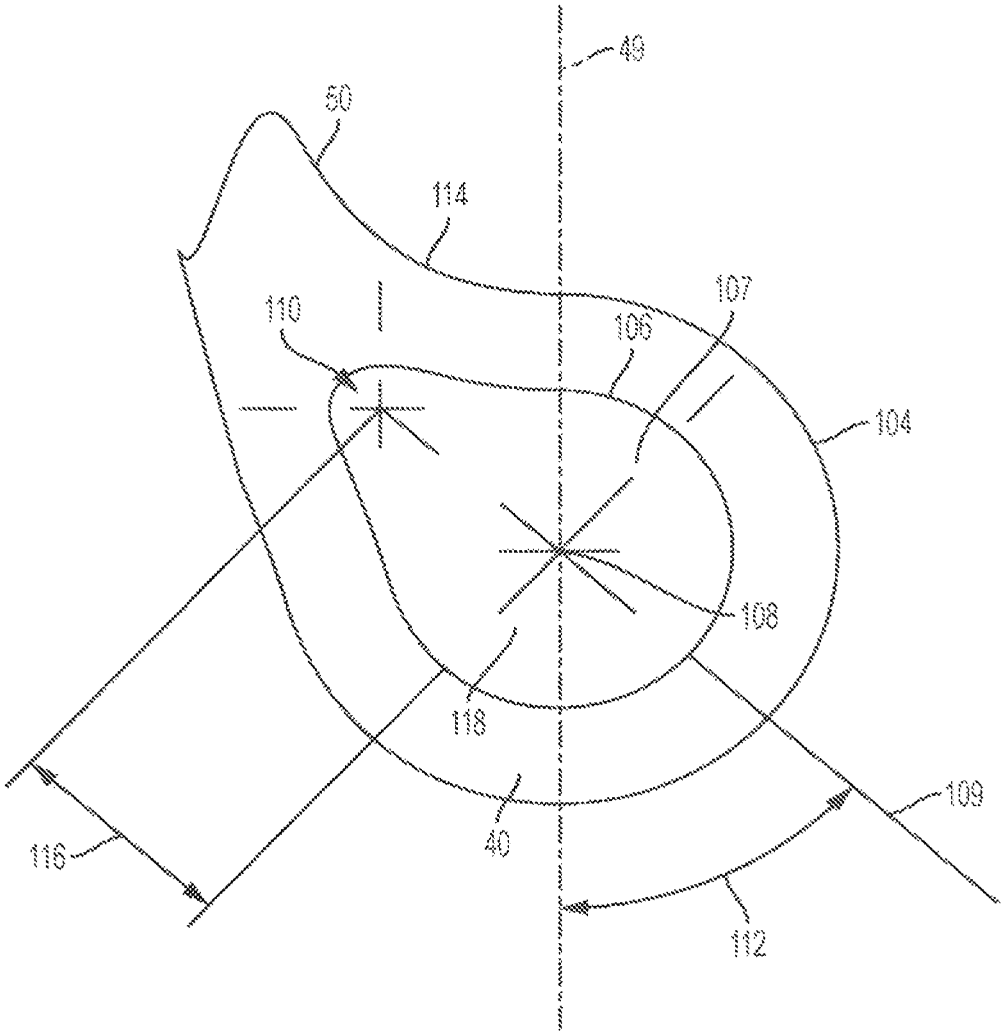
FIG. 7 is a close up side elevation view of the bottom grommet of FIG. 4.
Figure 8:
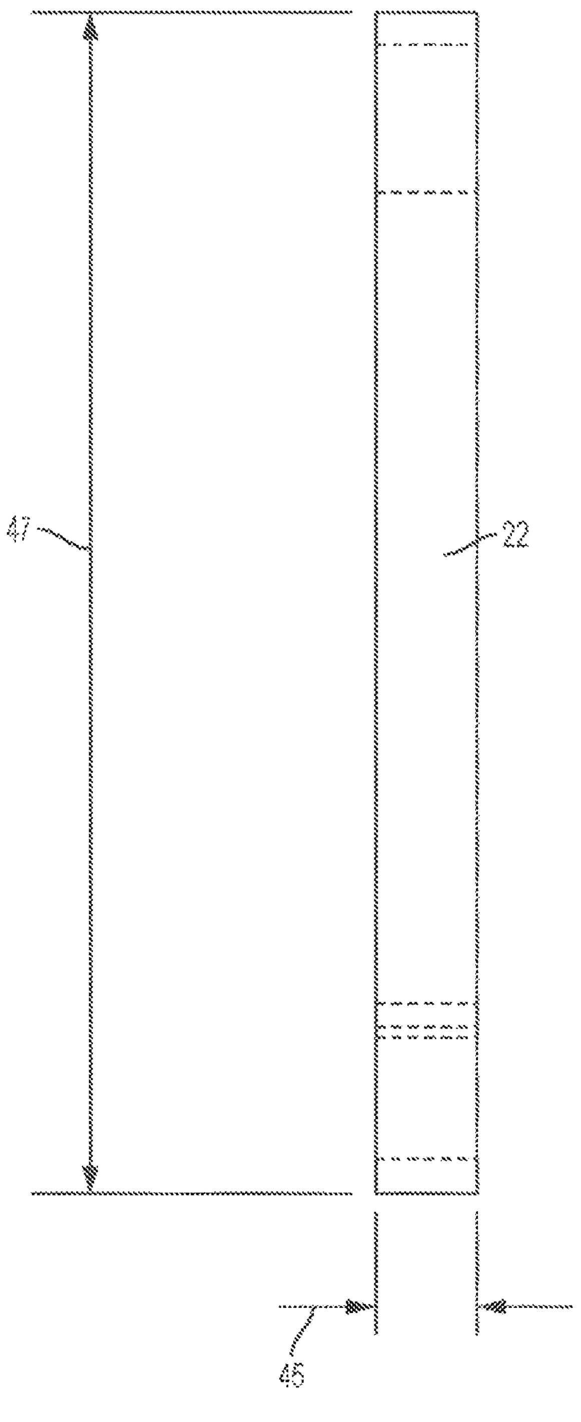
FIG. 8 is a rear elevation view of the alpha link of FIG. 4.

FIG. 7 illustrates one embodiment of a bottom alpha link grommet 40. In some embodiments, the bottom alpha link grommet 40 includes some features similar to the top alpha link grommet 38 but the bottom alpha link grommet has different dimensions, shapes, and/or is oriented differently with respect to the alpha link body 42 than the top alpha link grommet to allow compact nesting when the grille 20 is in the retracted state. In one embodiment, the bottom alpha link grommet includes an opening extending therethrough configured to receive one of the plurality of cross members 26. In one embodiment, the bottom alpha link grommet midpoint 48 is positioned on a second side of the midline 70 of the alpha link body 42. In one embodiment, the shortest distance from the bottom alpha link grommet midpoint 48 to the midline 70 is equal to the shortest distance from the top alpha link grommet midpoint 46 to the midline 70.

In one embodiment, the bottom alpha link grommet 40 is characterized by an outer wall 104 and an inner wall 106 (best seen in FIG. 7). In one embodiment, the outer wall 104 is defined by an arc. In one embodiment, the arc defining the outer wall 104 has a radius equal to that of the outer wall 72 of the top alpha link grommet 38. In one embodiment, a transition 114 is contiguous with the outer wall 104 and the inner edge 50 of the alpha link body 42. In one embodiment, the transition 114 is characterized by an arc having a radius of about 0.1 inches to about 0.5 inches. In one embodiment, the transition 114 may have the same radius as the transition 74 adjacent the top alpha link grommet 38. In one embodiment, the arc defining the transition 114 has a radius slightly larger than the arc defining the outer wall 104 such that the outer wall compactly nests with a link of an adjoining link layer (best seen in FIG. 13).

In one embodiment, the inner wall 106 is characterized by an opening 107 having a tear drop shape similar to the shape of the inner wall 78 of the top alpha link grommet 38 (FIG. 7). In one embodiment, the bottom alpha link grommet 40 includes a major portion center point 108 and a minor portion center point 110. In one embodiment, an angle 112 is formed at the intersection of the axis 49 connecting the first and bottom alpha link grommet midpoints and an axis 109 connecting the major portion center point 108 and the minor portion center point 110. In one embodiment, the angle 112 is about 40° to about 60°. In one embodiment, the angle 112 is about 50°. In one embodiment, the angle 112 of the bottom alpha link grommet is greater than the angle 94 of the top alpha link grommet 94. In one embodiment, the major portion center point 108 is separated from the minor portion center point 110 by a distance 116 of about 0.175 inches to about 0.3 inches. In one embodiment, the distance 116 is equal to the distance 102 between the major portion center point 84 and the minor portion center point 90 of the top alpha link grommet 38. In one embodiment, the major portion 118 is characterized by a segment of a circle having a radius of about 0.1 inches to about 0.3 inches. In one embodiment, the minor portion 120 is characterized by a segment of a circle having a radius of about 0.01 inches to about 0.1 inches. In one embodiment, a transition 122 between the major portion 118 and minor portion 120 is characterized by an arc or fillet having a radius of about 0.2 inches to about 0.5 inches. In one embodiment, the top alpha link grommet 38 and the lower link grommet 40 are substantially identical. In one embodiment, the top alpha link grommet 38 and the bottom link grommet 40 are substantially identical but the angle 112 of the bottom grommet is different from the angle 94 of the top grommet.

Figure 9:
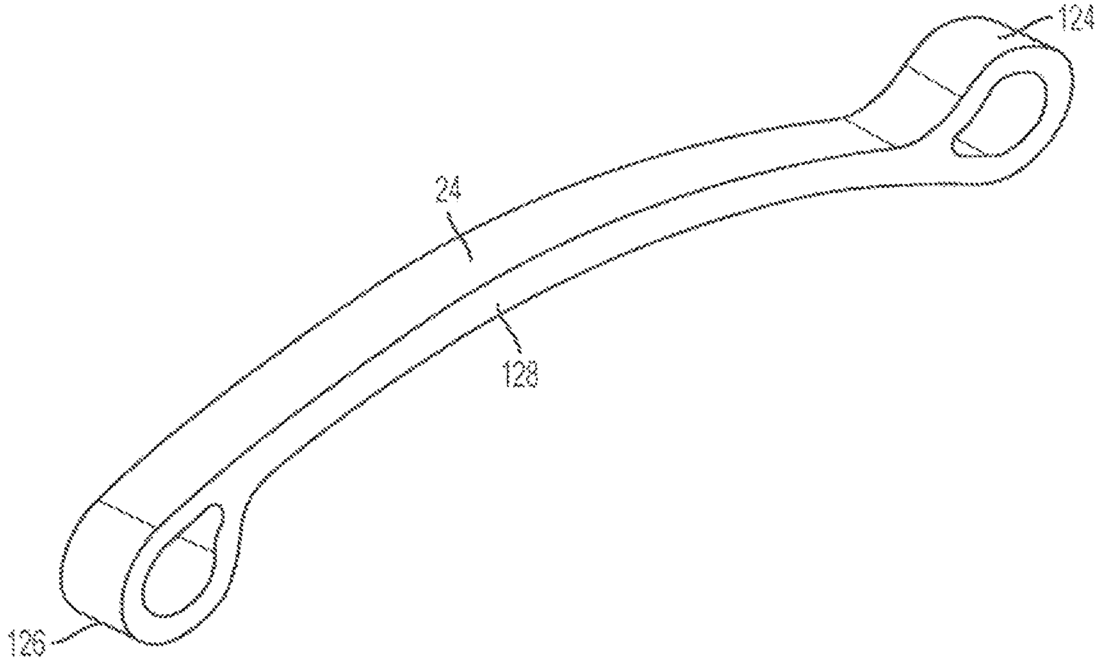
FIG. 9 is a front perspective view of a beta link in accordance with an exemplary embodiment of the present invention.
Figure 10:
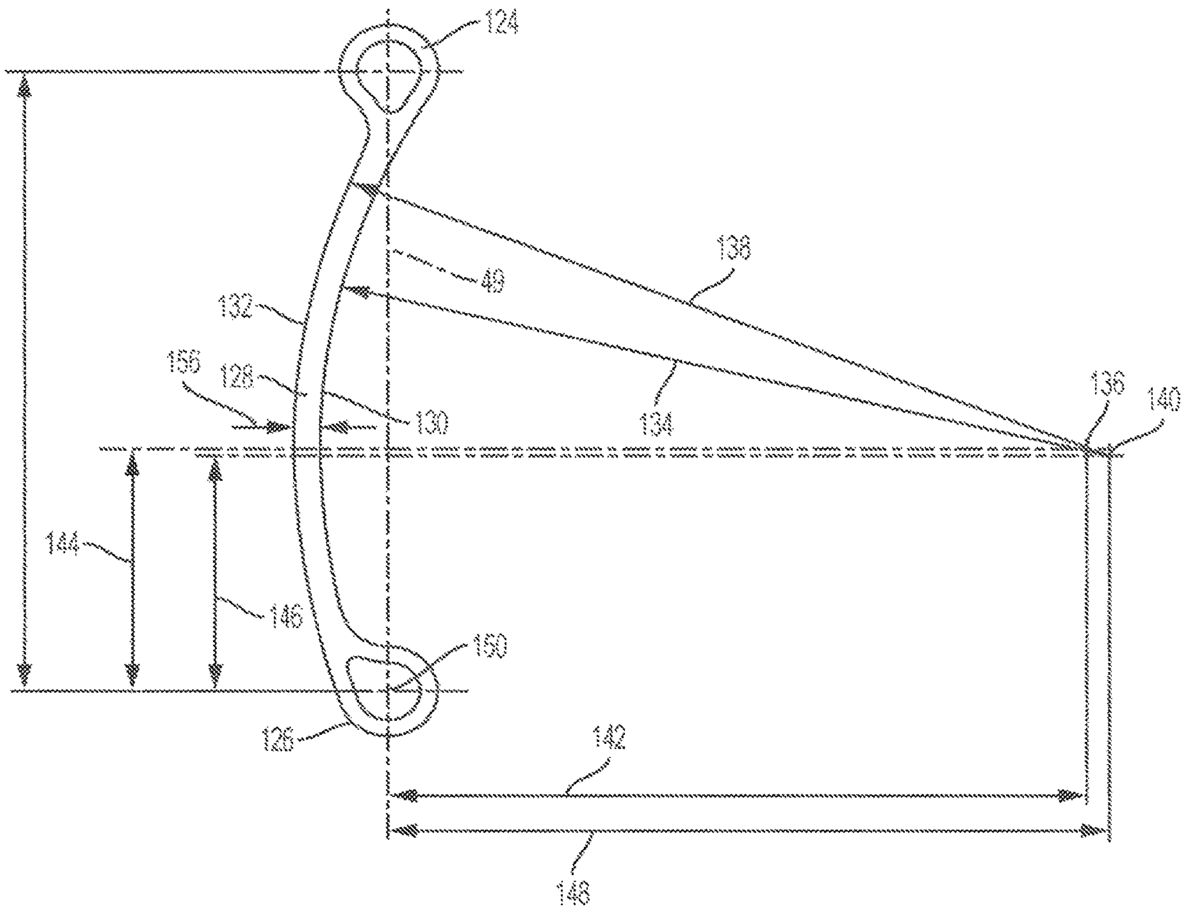
FIG. 10 is a side elevation view of the beta link of FIG. 9.

FIGS. 9-10 illustrate one embodiment of a beta link 24. In one embodiment, the beta link 24 includes some of the same features (e.g., a body, a first grommet, and a second grommet) as the alpha link but includes different shapes, dimensions, and/or orientations selected to provide compact nesting when the grille 20 is in the retracted state. In one embodiment, the beta link 24 includes a top beta link grommet 124 and a bottom beta link grommet 126, each coupled to a beta link body 128. In one embodiment, the beta link body 128 is configured such that the top beta link grommet 124 is adjacent the top alpha link grommet and the bottom beta link grommet is adjacent the bottom alpha link grommet when the grille is in the retracted state. In one embodiment, the beta link body includes an inner edge 130 and an outer edge 132. In one embodiment, the inner edge 130 is characterized by an arc having a radius 134 with an inner edge radius center point 136. In one embodiment, the inner edge radius 134 is about 3 to about 5 inches. In one embodiment, the outer edge 132 is characterized by an arc having a radius 138 win an outer edge arc radius center point 140. In one embodiment, the outer edge radius 138 is about 3.3 inches to about 4.2 inches. In one embodiment, the difference between the inner edge radius 134 and the outer edge radius 138 of the beta link 24 is within about 25% to about 30% of the difference between the inner edge radius 54 and the outer edge radius 56 of the alpha link 22. In one embodiment, the distance 142 between the bottom beta link grommet center point 150 and the inner edge radius center point 134 is about 2.6 inches to about 4.3 inches. In one embodiment, the distance 144 between the inner edge bottom beta link grommet center point 150 and the inner edge radius center point 134 is about 1 inch to about 1.7 inches. In one embodiment, the distance 146 between the outer edge radius center point 140 and the bottom beta link grommet center point 150 is about 0.9 inches to about 1.6 inches. In one embodiment, the distance 148 between the outer edge radius center point 140 and the bottom beta link grommet center point 150 is about 2.9 inches to about 4.3 inches. In one embodiment, the beta link 24 includes a width 156 characterized by the distance between the beta link inner edge 130 and the beta link outer edge 132. In one embodiment, the beta link inner edge 130 is about 1.8 inches to about 3 inches. In one embodiment, the beta link outer edge 132 is about 2 inches to about 3.2 inches. In one embodiment, the alpha link width 71 is within about 75% to about 100% of the beta link width 156. In one embodiment, a ratio of the length of the alpha link midline 70 to the length of a beta link midline is about 0.6 to about 1. In one embodiment, a ratio of the length of the beta link 24 to the length of the alpha link 22 is about 1 to about 1.7. In one embodiment, the beta link 24 is characterized by a length configured such that the top beta link grommet 124 is adjacent the top alpha link grommet 38 and the bottom beta link grommet 126 is adjacent the bottom alpha link grommet 40 when the grille 20 is in the retracted state.

In some embodiments, the top beta link grommet 124 and the bottom beta link grommet 126 are substantially similar to the top alpha link grommet 38 and bottom alpha link grommet 40, respectively. In one embodiment, the top and bottom grommets of each of the alpha link, beta link, and any intermediary links are substantially similar such that the grommets can compactly nest with the top and bottom grommets, respectively, of the adjacent link layer(s). In one embodiment, the top beta link grommet 124 is substantially similar to the top alpha link grommet 38 but the angle 94 between the axis 92 and the axis 49 of the beta link 24 is about 2° to about 5.5°. In one embodiment, the bottom beta link grommet 124 is substantially similar to the bottom alpha link grommet 40 but the angle 112 between the axis 49 of the beta link 24 and the axis 109 is about 45° to about 55°.

In some embodiments, at least two links are coupled to each cross member to couple the grille 20 together. In one embodiment, the second grommet of one link and the first grommet of another link are each coupled to the same cross member 26 such that the one link is above the cross member and the other link is below the cross member when the grille 20 is in the extended state (best seen in FIGS. 1 and 11). In one embodiment, the first grommet of one link and the second grommet of the other link are adjacent each other when they are coupled to the same cross member 26. In one embodiment, the first grommet of one link and the second grommet of another link are coupled to the same cross member 26 and are spaced from each other along the cross member axis 31. In some embodiments, the alpha links 22 are configured such that the major portion 80 of the top alpha link grommet 38 of a first alpha link is coaxial with the major portion 118 of the bottom alpha link grommet 40 of a second alpha link 22.

In some embodiments, the grille 20 includes a plurality of alpha links 22 daisy chained together to form the link layer 21 when the grille 20 is in the retracted state (best seen in FIG. 13). In some embodiments, the number of alpha links 22 included in the grille 20 is such that the alpha links form a complete single revolution about the shaft 28. In one embodiment, an alpha link having a relatively shorter length will nest more compactly about the shaft than an alpha link having a relatively longer length. In one embodiment, the alpha link layer 21 includes eight alpha links 22. In one embodiment, the layer 21 of alpha links 22 includes from six to ten alpha links. In one embodiment, the bottom alpha link grommet 40 of a first alpha link 22 and the top alpha link grommet 38 of a second alpha link 22 are both coupled to the same cross member 26. In one embodiment, the cross member 26 is received in the bottom alpha link grommet 40 of a plurality of alpha links 22 such that the plurality of alpha links are all horizontally spaced from each other along the cross member axis 31 when the grille is in the extended state (FIG. 1). In one embodiment, the plurality of alpha links 22 are secured in position along the cross member axis 31 by locking nuts, spacers, etc.

Figure 11:
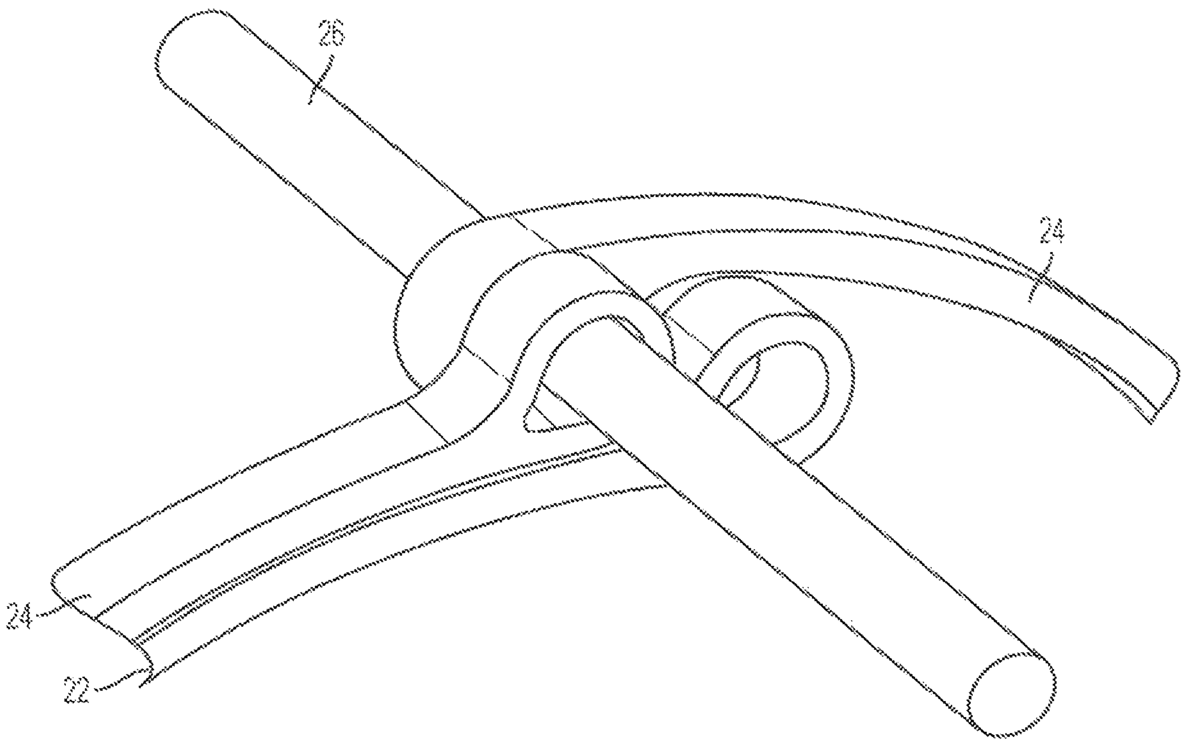
FIG. 11 is a side perspective view of the alpha link of FIG. 4, the beta link of FIG. 9, and the cross member of FIG. 3.
Figure 12:
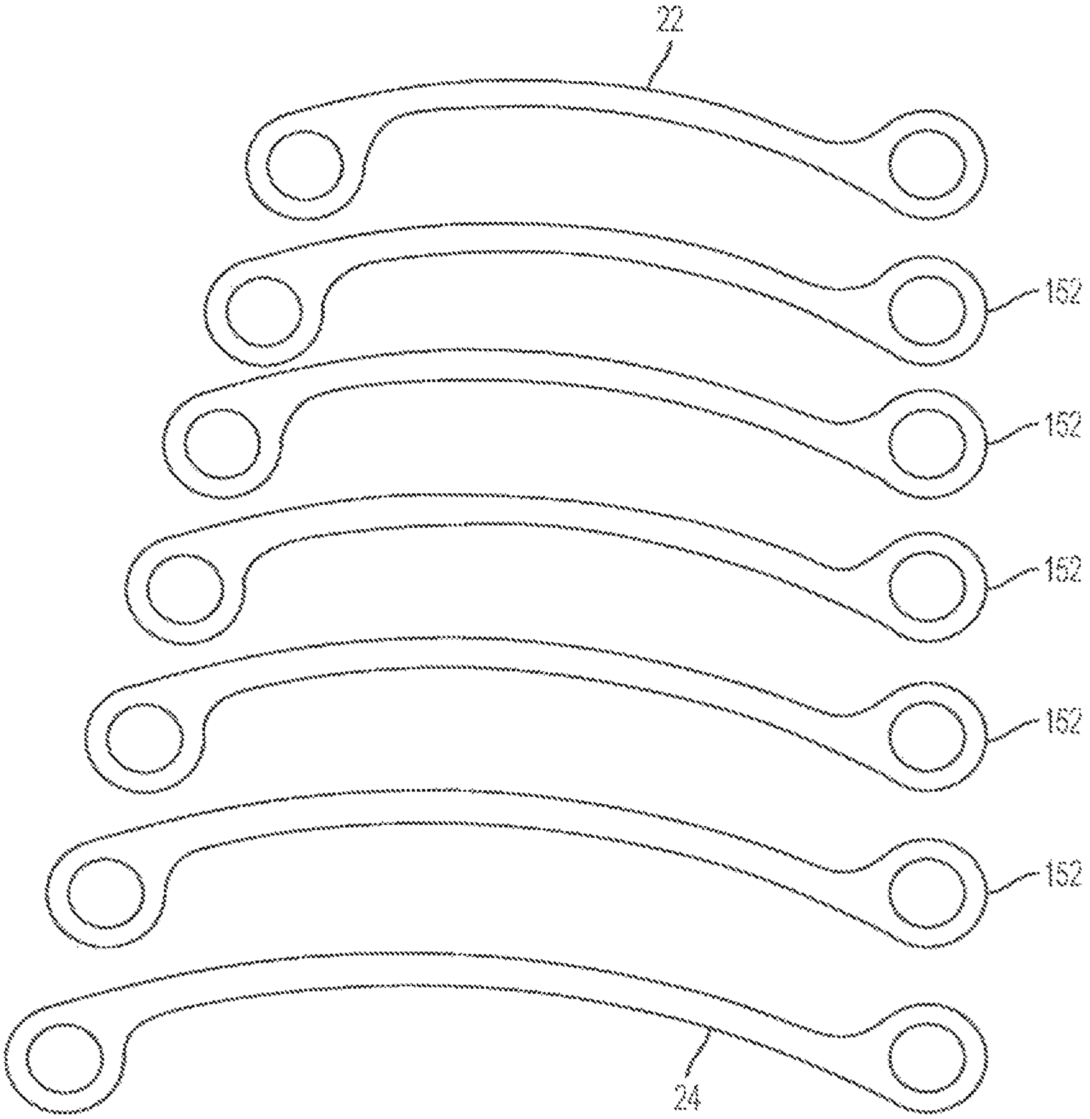
FIG. 12 is a side elevation view of the alpha link of FIG. 4, the beta link of FIG. 9, and intermediary links in accordance with an exemplary embodiment of the present invention.

In some embodiments, the beta link layer 23 is adjacent the alpha link layer 21 when the grille 20 is in the retracted state (FIG. 11). In some embodiments, one or more intermediary layers 151 are formed by intermediary links 152 (FIG. 13). In some embodiments, the intermediary links 152 are progressively larger than the alpha link 22 and approach the size of the beta link 24 (FIG. 12). In one embodiment, the number of links in the alpha layer 21, the intermediary layer 151 and the beta layer 23 are each equal. In one embodiment, the length of the intermediary link body is such that the alpha link 22, beta link 24, and intermediary link 152 each have an equal length as measured in radians. In some embodiments, the intermediary links 152 include an arcuate body having a concave edge and a convex edge. In one embodiment, the concave edge of the intermediary links 152 are adjacent to (e.g., touching or closely associated with) the outer edge of the alpha link 22 or the convex edge of an intermediary link 152 in an adjacent intermediary layer 151. In one embodiment, the convex edge of the intermediate link is adjacent to the beta link inner edge 130 or the concave edge of an intermediary link 152 in an adjacent intermediary layer 151.

Figure 14:
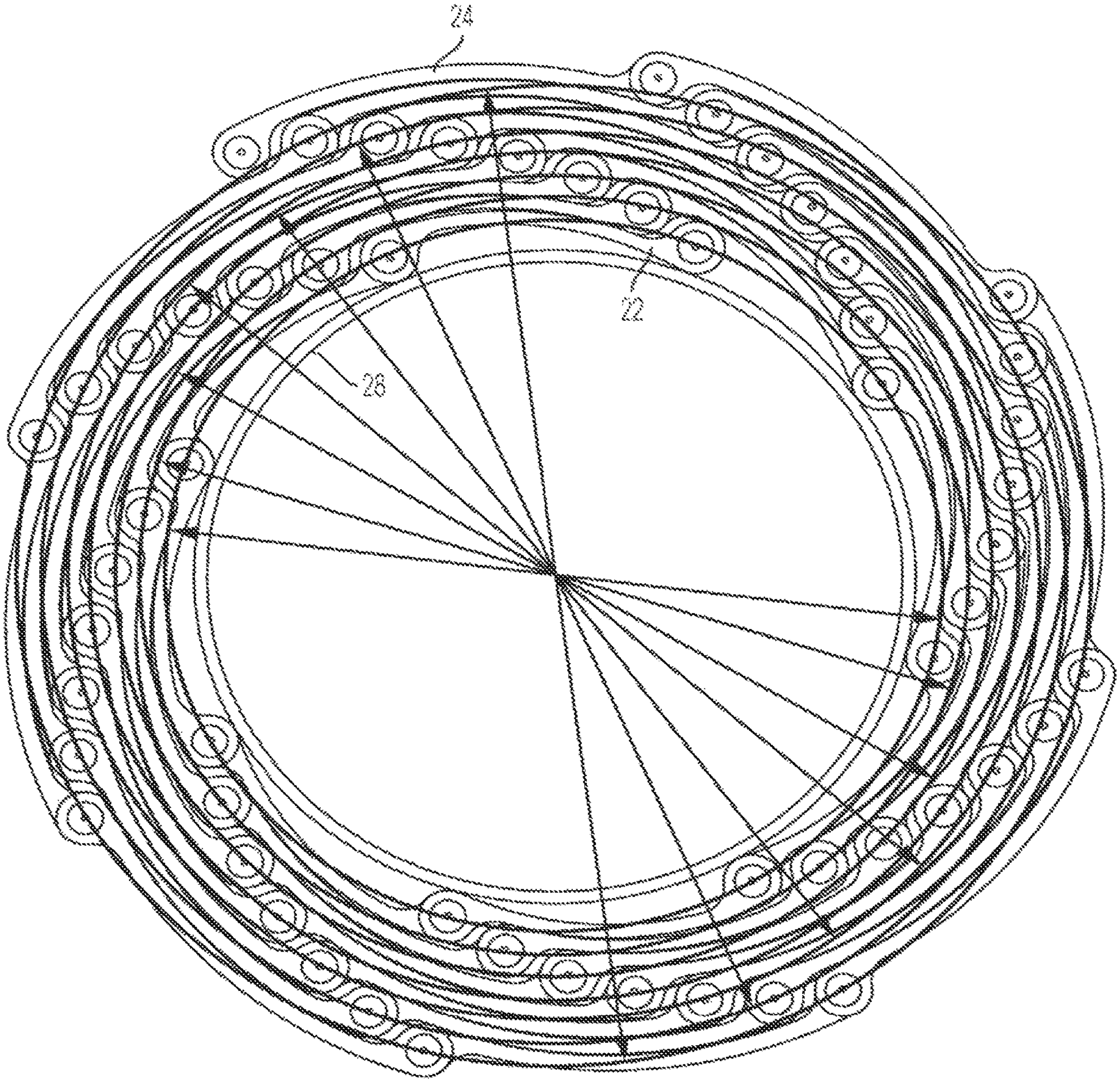
FIG. 14 is a sectional view of the grille and shaft of FIG. 1 in the retracted state with connecting lines.
Figure 15:
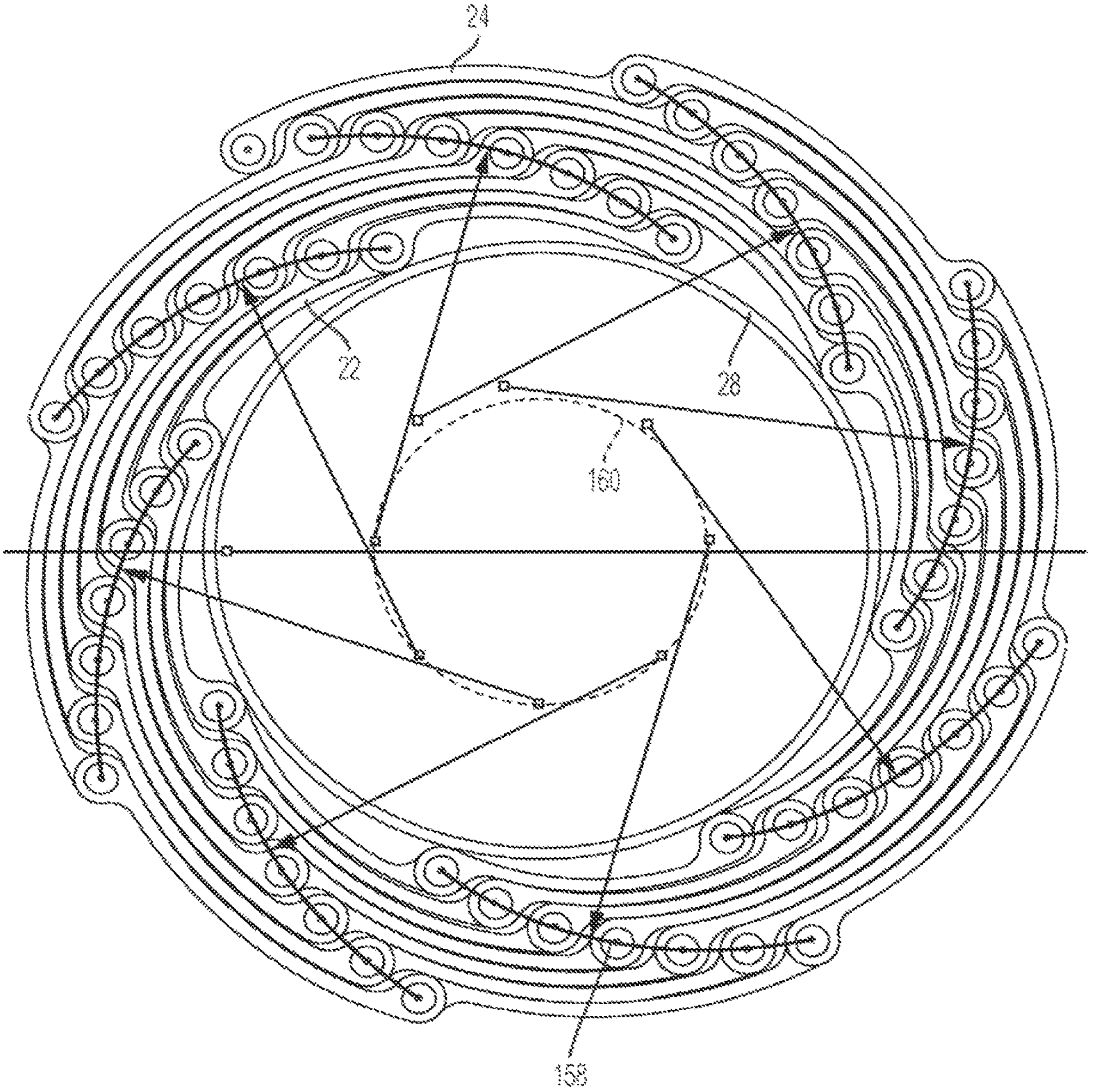
FIG. 15 is a sectional view of the grille and shaft of FIG. 1 in the retracted state with connecting lines.

In some embodiments, the alpha link layer 21 includes a sufficient number of alpha links 22 such that the alpha link layer 21 encircles the shaft 28 (FIG. 13). In some embodiments, the alpha link layer 21 includes a sufficient number of alpha links 22 such that an alpha link overlaps at least a portion of another alpha link. In some embodiments, the alpha link layer 21 includes a sufficient number of alpha links 22 such that the bottom alpha link grommet 40 of the last alpha link overlaps and nests with the top alpha link grommet 38 of the first alpha link and the top beta link grommet 124 of the first beta link 24 aligns with the bottom alpha link grommet 40 of the last alpha link into an adjacent nesting position relative to the top alpha link grommet of the first alpha link. In some embodiments, the beta link layer 23, and any intermediary layer(s), is configured to include the same quantity of links as the alpha link layer 21. In one embodiment, the equal number of alpha and beta links, and the shape of the links, are such that each link compactly nests with the link (radially inward or outward) from an adjacent link layer when the grille is in the retracted state. In some embodiments, a line through the midpoints of each grommet of the links forming a link layer is an arc encircling the shaft 28 (FIG. 14). In one embodiment, the alpha link 22 is included in a plurality of alpha links that form a single, substantially circular alpha link layer 21 when the door is in the retracted state. In one embodiment, a plurality of additional link layers each comprising a plurality of links having an arcuate link body disposed between a first link grommet and a second link grommet wherein each of the additional links are joined together and to the substantially circular outer link layer by a plurality of additional cross members to form a substantially circular nested layer configuration when the grille is in a retracted state. In some embodiments, the distance between adjacent circles is within about 10% to about 15% of the diameter of the cross member 26. In one embodiment, the distance between each of the adjacent circles are all within about 5% to about 15% of each other.

In some embodiments, a line 158 through the center point of the same grommet on each link layer (e.g., the top grommet of the fourth link in each link layer) is characterized by an arc having its center of radius on a circle 160. In one embodiment, the circle 160 is concentric with the shaft 28. In one embodiment, each line 158 is characterized by an arc and each arc has the same radius or within 10% of each other. In one embodiment, the line 158 extending through the grommets of the eighth link of each layer has a different arc radius than the other arc radii because the eighth link of each layer is coupled to the larger first link of the adjacent outer link layer. In some embodiments, the change in arc radius of the line 158 attenuates through the line of the sixth and seventh link of each layer. In one embodiment, the circle 160 has a radius of about 40% to about 60% of the radius of the shaft 28. In one embodiment, the substantially circular beta link layer 23, the substantially circular alpha link layer 21 and the intermediary link layers 151 are connected to form a continuous chain that circumscribes a central core to form a plurality of adjoining layers wherein at least one grommet in each layer is aligned with at least one grommet in an adjoining layer to form an arcuate line bisecting each grommet in the arcuate line. In one embodiment, when the grille 20 is in the retracted state, the substantially circular beta link layer 23, the substantially circular alpha link layer 21, and the intermediary link layers 151 are connected to form a continuous chain of link layers that circumscribes a central core to form plurality of adjoining layers wherein each link in each of the plurality of adjoining layers is in contact with no more than two links of a single adjoining layer.

Figure 16:
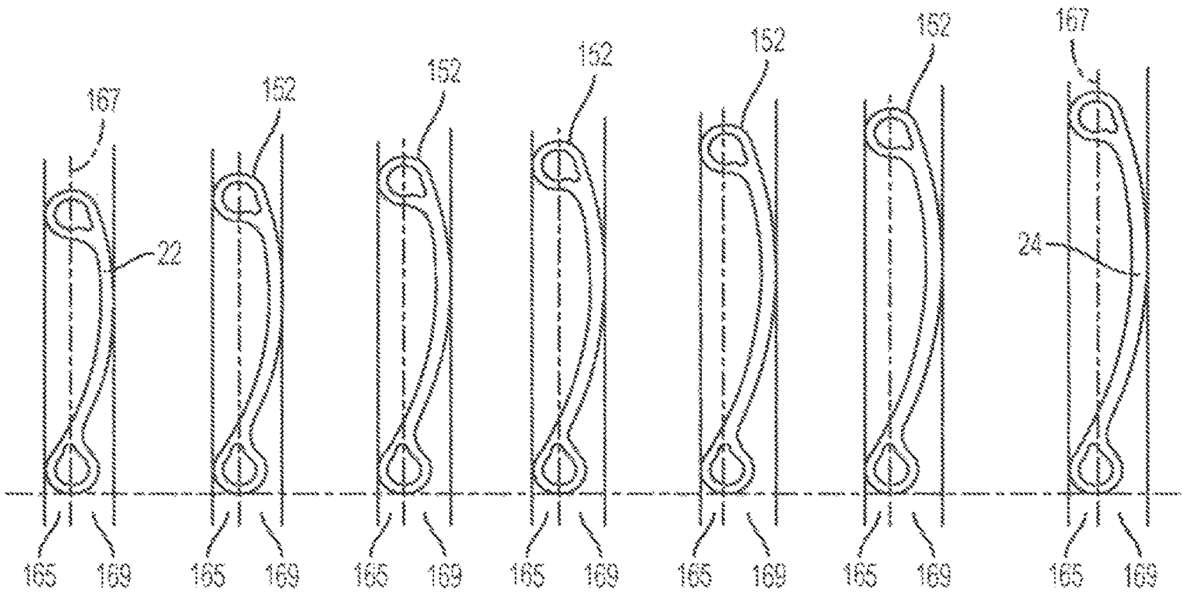
FIG. 16 is a side elevation view of the links of FIG. 12.
Figure 17:
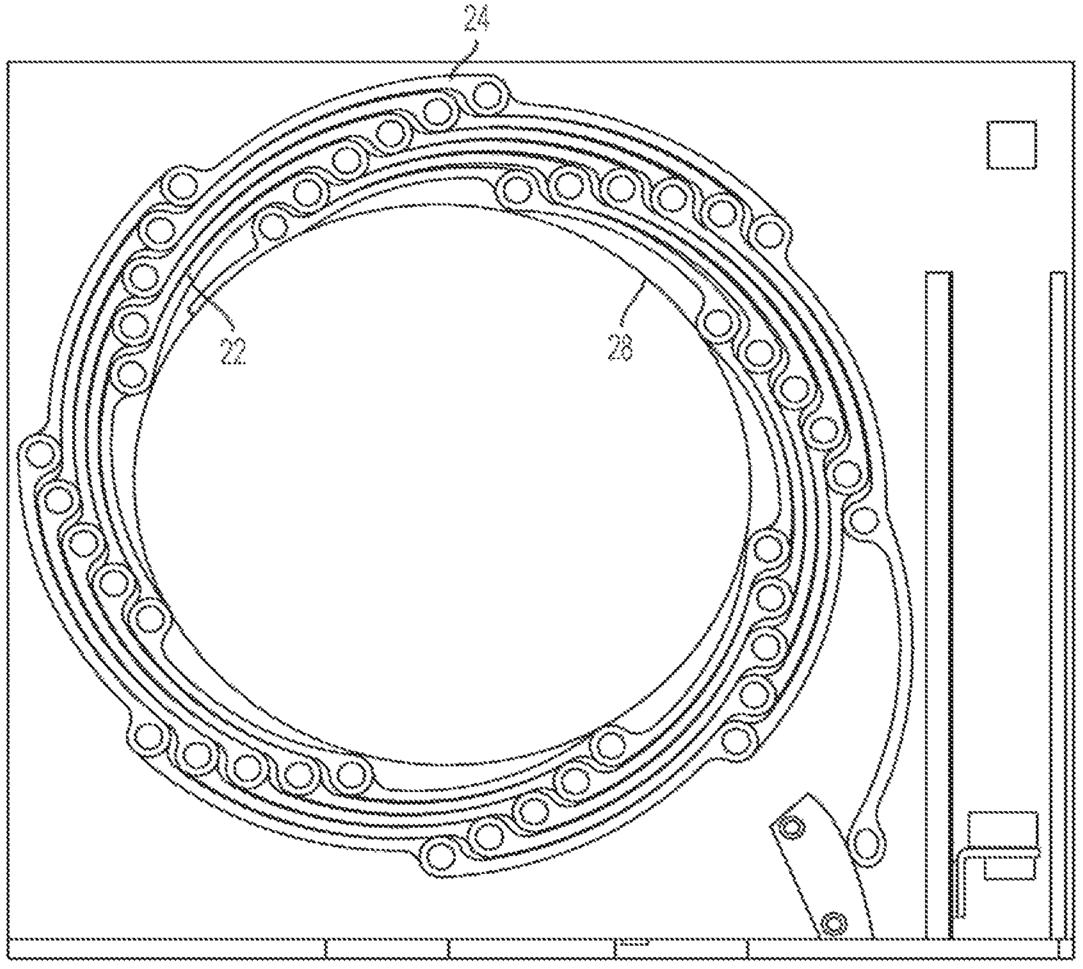
FIG. 17 is a side elevation view of the grille of FIG. 1.
Figure 18:
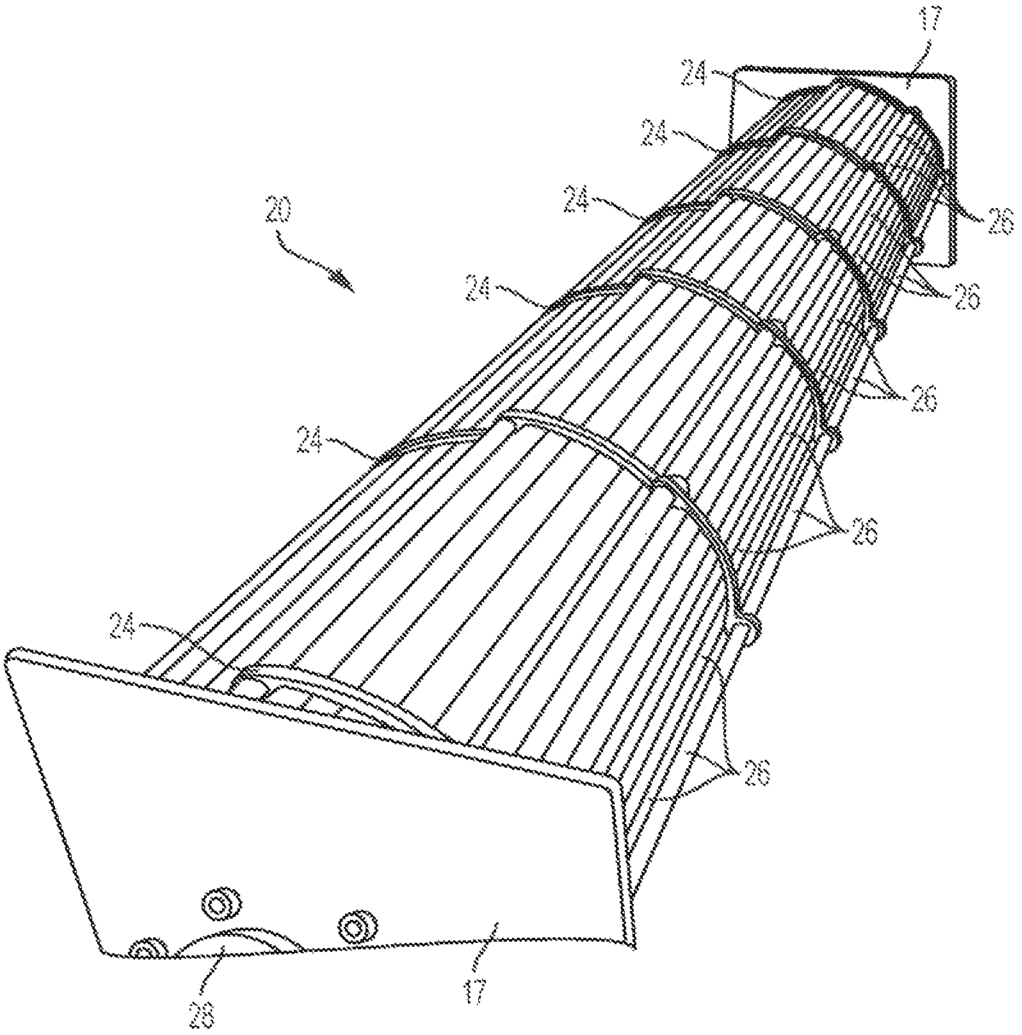
FIG. 18 is a perspective view of the grille of FIG. 1 in the retracted state.

In some embodiments, the clearance on a first side 165 of an axis 167 connecting the grommet center points of each link is the same for the alpha link 22, the beta link 24, and each of the intermediary links 152 (FIG. 16). In some embodiments, the consistent clearance across each of the links provides an increase in coiling reliability as compared to designs which do not have consistent clearance. In one embodiment, coiling reliability is the likelihood that the links will properly nest with each other as the grille is moved from the extended state to the retracted state. In one embodiment, the clearance on the second side the axis of each successive link increases by about 2% to about 5%.

In some embodiments, the shaft 28 is rotated by the motor 30 to move the grille 20 between the retracted state and the extended state. In some embodiments, the motor 30 rotates the shaft in a retraction direction 154 when activated (FIG. 13). In one embodiment, the alpha links 22 encircle the shaft and form the alpha link layer 21 as the shaft 28 rotates. In one embodiment, the bottom alpha link grommet 40 of the last alpha link 29 in the alpha link layer 21 is above the alpha link body 42 of the first alpha link 27 in the alpha link layer 21 when the grille is in the retracted state. In one embodiment, the arcuate outer wall of the grommets urges the grommets into alignment in the space adjacent the grommet outer wall, transition, and body of an adjacent link layer. In one embodiment, the bottom alpha link grommet 40 of the last alpha link 29 in the alpha link layer 21 is above the alpha link body 42 of the first alpha link 27 in the alpha link layer 21 such that the alpha link layer 21 extends slightly more than 360° about the shaft 28 when the grille is in the retracted state. In one embodiment, the grille 20 produces a maximum sound of about 60 dB to about 70 dB as the grille moves between the retracted state and the extended state. In one embodiment, the last beta link is coupled to a bottom bar (not shown) which may be used to secure the grille 20 in the extended position. In one embodiment, the bottom bar is stored in the head space with the grille 20 when the grille 20 is in the retracted state.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "right", "left", "lower" and "upper" designate directions in the drawings to which reference is made. The words "inwardly" and "outwardly" refer to directions toward and away from, respectively, the geometric center of the link. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

We claim:

1. An alpha link for a compact nesting grille, comprising:

an arcuate shaped body comprising an inner edge and an outer edge, wherein the inner edge and the outer edge comprise a plurality of arc segments having different radii such that the arcuate shaped body comprises varying thickness along a length of the arcuate shaped body;

a top alpha link grommet having an opening along the outer edge of the arcuate shaped body entirely on a first side of a midline of the arcuate shaped body; and a bottom alpha link grommet having an opening along the inner edge of the arcuate shaped body entirely on a second side of the midline that is obverse the first side, wherein a top alpha link grommet midpoint of the top alpha link grommet and a bottom alpha link grommet midpoint of the bottom alpha link grommet are positioned on a common axis, wherein the arcuate shaped body, the top alpha link grommet, and the bottom alpha link grommet have a thickness between 0.15 inches to 0.35 inches.

2. The alpha link of claim 1, wherein the opening of the top alpha link grommet is capable of receiving a first cross member and the opening of the bottom alpha link grommet is capable of receiving a second cross member.

3. The alpha link of claim 2, wherein a length of the alpha link comprises a distance between the top alpha link grommet midpoint and the bottom alpha link grommet midpoint and the length of the alpha link defines a distance between the first cross member and the second cross member.

4. The alpha link of claim 1, wherein the inner edge of the arcuate shaped body comprises an inner arc radius and the outer edge of the arcuate shaped body comprises an outer arc radius.

5. The alpha link of claim 4, wherein the inner arc radius or the outer arc radius comprises the plurality of arc segments having different radii such that a width measured between the inner edge and the outer edge varies.

6. The alpha link of claim 4, wherein the outer edge arc radius is approximately 1% to 2% greater than the inner arc radius.

7. The alpha link of claim 1, wherein the opening of the top alpha link grommet and the opening of the bottom alpha link grommet comprise a tear drop shape, wherein the tear drop shape comprises:

a major portion having a major radius that is about 0.1 inches to about 0.3 inches;

a minor portion having a minor radius that is about 0.02 inches to about 0.075 inches;

a first transition; and a second transition, wherein the first transition and the second transition are between the major portion and the minor portion.

8. A compact nesting grille, comprising:

a plurality of alpha links;

a plurality of intermediary links;

a plurality of beta links; and a plurality of cross members, wherein the plurality of alpha links receives a first cross member of the plurality of cross members, the plurality of intermediary links receives an intermediate cross member of the plurality of cross members, and the plurality of beta links receives a last cross member of the plurality of cross-members, wherein the plurality of alpha links, the plurality of intermediary links, and the plurality of beta links, each comprises:

an arcuate shaped body comprising an inner edge and an outer edge, wherein the inner edge and the outer edge comprise a plurality of arc segments having different radii such that the arcuate shaped body comprises varying thickness along a length of the arcuate shaped body;

a top grommet having an opening along the outer edge of the arcuate shaped body entirely on a first side of a midline of the arcuate shaped body; and a bottom grommet having an opening along the inner edge of the arcuate shaped body entirely on a second side of the midline that is obverse the first side, wherein a top grommet midpoint of the top grommet and a bottom grommet midpoint of the bottom grommet are positioned on a common axis, wherein the plurality of cross members are fed through the top grommet and the bottom grommet of the plurality of alpha links, the plurality of intermediary links, and the plurality of beta links, wherein the arcuate shaped body, the top grommet, and the bottom grommet have a thickness between 0.15 inches to 0.35 inches.

9. The compact nesting grille of claim 8, wherein a length of each one the plurality of intermediary links is greater than a length of each one of the plurality of alpha links.

10. The compact nesting grille of claim 9, wherein a length of each one the plurality of beta links is greater than the length of each one of the plurality of intermediary links.

11. The compact nesting grille of claim 8, wherein each one of the plurality of alpha links receives the first cross member through the bottom grommet of each one of the plurality of alpha links and is spaced apart along a cross member axis.

12. The compact nesting grille of claim 11, wherein each one of the plurality of intermediary links receives the first cross member through the top grommet of each one of the plurality of intermediary links and is spaced apart along the cross member axis.

13. The compact nesting grille of claim 12, wherein each one of the plurality of intermediary links receives the intermediate cross member through the bottom grommet of each one of the plurality of intermediary links and is spaced apart along the cross member axis.

14. The compact nesting grille of claim 13, wherein each one of the plurality of beta links receives the intermediate cross member through the top grommet of each one of the plurality of beta links and is spaced apart along the cross member axis.

15. The compact nesting grille of claim 14, wherein each one of the plurality of beta links receives the last cross member through the bottom grommet of each one of the plurality of beta links and is spaced apart along the cross member axis.

16. A closure, comprising:

a first track;

a second track;

a shaft;

a motor coupled to the shaft; and a compact nesting grille coupled to the shaft, wherein the compact nesting grille comprises a plurality of cross members, wherein the plurality of cross members extend into the first track and the second track, wherein the plurality of cross members are coupled to a plurality of links, wherein a first row of the plurality of links comprises a plurality of alpha links, a last row of the plurality of links comprises a plurality of beta links, and intermediary rows of the plurality of links comprise a plurality of intermediary links, wherein each of the plurality of links, comprises:

an arcuate shaped body comprising an inner edge and an outer edge, wherein the inner edge and the outer edge comprise a plurality of arc segments having different radii such that the arcuate shaped body comprises varying thickness along a length of the arcuate shaped body;

a top grommet having an opening along the outer edge of the arcuate shaped body entirely on a first side of a midline of the arcuate shaped body; and a bottom grommet having an opening along the inner edge of the arcuate shaped body entirely on a second side of the midline that is obverse the first side, wherein a top grommet midpoint of the top grommet and a bottom grommet midpoint of the bottom grommet are positioned on a common axis, wherein the plurality of cross members are fed through the top grommet and the bottom grommet of the plurality of links, wherein the arcuate shaped body, the top grommet, and the bottom grommet have a thickness between 0.15 inches to 0.35 inches.

17. The closure of claim 16, wherein the plurality of alpha links has a shortest length of the plurality of links and the plurality of beta links has a longest length of the plurality of links.

18. The closure of claim 17, wherein a length of the plurality of intermediary links of each intermediary row of the intermediary rows is gradually longer from the first row of the plurality of alpha links to the last row of the plurality of beta links.

19. The closure of claim 16, wherein each row of the plurality of links forms a link layer, wherein the plurality of links within the link layer nests within the plurality of links of an adjacent link layer.

20. The closure of claim 19, wherein a first cross member of the plurality of cross members is fed through the bottom grommet of the plurality of alpha links in the first row and through the top grommet of the plurality of intermediary links in a first intermediary row of the intermediary rows.

* * * * *